Sept. 26, 1939.  C. W. HARROLD ET AL  2,173,839
INKER MECHANISM
Original Filed July 19, 1935   8 Sheets-Sheet 1

INVENTORS.
CHARLES W. HARROLD
BY  JAMES R. WOOD
ATTORNEYS.

Fig. 3

Sept. 26, 1939.   C. W. HARROLD ET AL   2,173,839
INKER MECHANISM
Original Filed July 19, 1935   8 Sheets-Sheet 3

INVENTORS.
CHARLES W. HARROLD
JAMES R. WOOD
BY
Kwis, Hudson & Kent
ATTORNEYS

Sept. 26, 1939.  C. W. HARROLD ET AL  2,173,839
INKER MECHANISM
Original Filed July 19, 1935   8 Sheets-Sheet 4

INVENTORS
CHARLES W. HARROLD
BY JAMES R. WOOD

Hwis, Hudson & Kent
ATTORNEYS

Sept. 26, 1939.　　C. W. HARROLD ET AL　　2,173,839
INKER MECHANISM
Original Filed July 19, 1935　　8 Sheets-Sheet 5

Fig. 8

INVENTORS
CHARLES W. HARROLD
BY JAMES R. WOOD
Hurd, Hudson & Kent
ATTORNEYS.

Sept. 26, 1939.  C. W. HARROLD ET AL  2,173,839
INKER MECHANISM
Original Filed July 19, 1935   8 Sheets-Sheet 6

INVENTORS:
CHARLES W. HARROLD
BY JAMES R. WOOD
Kwis, Hudson & Kent
ATTORNEYS Sept. 26, 1939.   C. W. HARROLD ET AL   2,173,839
INKER MECHANISM
Original Filed July 19, 1935    8 Sheets-Sheet 7

Bed at end of travel preceding reverse stroke

Fig. 14

Bed at beginning of uniform motion of reverse stroke

Fig. 15

Bed at end of uniform motion of reverse stroke

Fig. 16

INVENTORS.
CHARLES W. HARROLD
JAMES R. WOOD
BY
Kwis, Hudson & Kent
ATTORNEYS Sept. 26, 1939.　　　C. W. HARROLD ET AL　　　2,173,839
INKER MECHANISM
Original Filed July 19, 1935　　8 Sheets-Sheet 8

Bed end of travel preceding printing stroke

Fig.17

Bed at beginning of uniform motion of printing stroke

Fig.18

Bed at end of uniform motion of printing stroke

Fig.19

INVENTORS.
CHARLES W. HARROLD
BY JAMES R. WOOD

Kwis, Hudson & Kent
ATTORNEYS.

Patented Sept. 26, 1939

2,173,839

UNITED STATES PATENT OFFICE 2,173,839

INKER MECHANISM

Charles W. Harrold, Shaker Heights, Ohio, and James R. Wood, Shelton, Conn., assignors to Harris-Seybold-Potter Company, Cleveland, Ohio, a corporation of Delaware Application July 19, 1935, Serial No. 32,258
Renewed December 23, 1938

30 Claims.  (Cl. 101—356)

This invention relates to improvements in inker mechanism, being intended primarily for use in connection with flat bed printing presses.

One of the objects of the invention is the provision of an inker mechanism of such character that thorough and efficient distribution of the ink is accomplished by relatively few rollers occupying relatively small space.

Another object is the provision of an inker mechanism wherein the rollers are so positioned and arranged that free circulation of air will take place around the composition rollers, thereby permitting greater press speed before the melting point of the rollers is reached.

Another object is the provision of an inker mechanism wherein the form roller sockets are readily accessible for adjustment, whether the press is stationary or running.

A further object is the mounting of the rollers in such manner as to readily permit removal of the composition rollers and cleaning of the metal rollers.

Another object of the invention is the provision of a roller arrangement and drive such that the path of the ink to the form rollers is interrupted during the time the ductor roller is applying ink to the distributing roller or rollers so as to prevent unevenly distributed ink from reaching the form.

Still another object is the provision of a transfer roller that is stationary or substantially so, when it takes ink from the ductor roller and rotates at the surface speed of a distributing roller when it transfers ink to the latter roller.

Other objects and features of novelty will appear as we proceed with the description of that embodiment of the invention which, for the purposes of the present application, we have illustrated in the accompanying drawings, in which.

Similar reference characters refer to like parts throughout the views.

Figure 1:
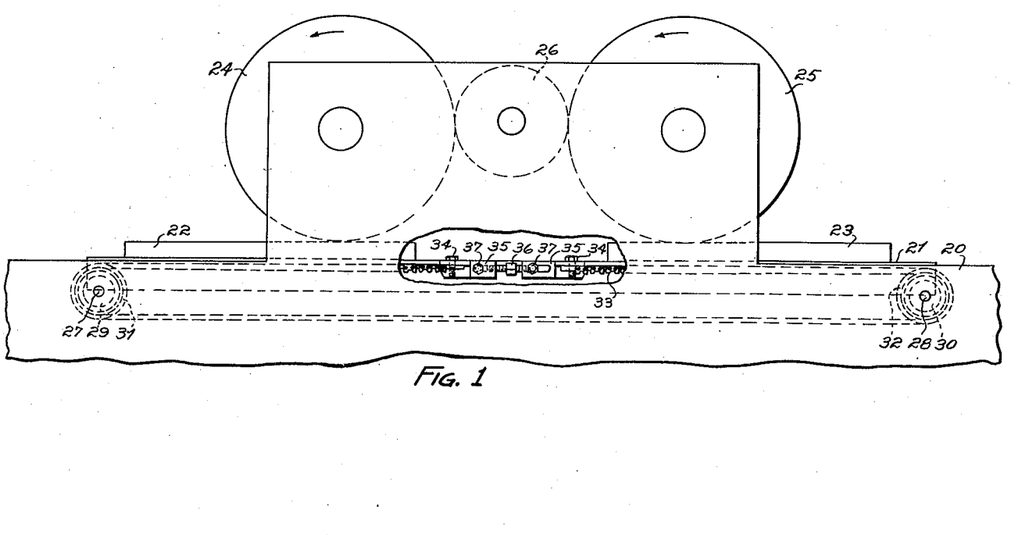
Fig. 1 is a fragmental diagrammatic elevational side view of a two-color flat bed printing press, showing a portion of the driving means for our inker mechanism.
Figure 2:
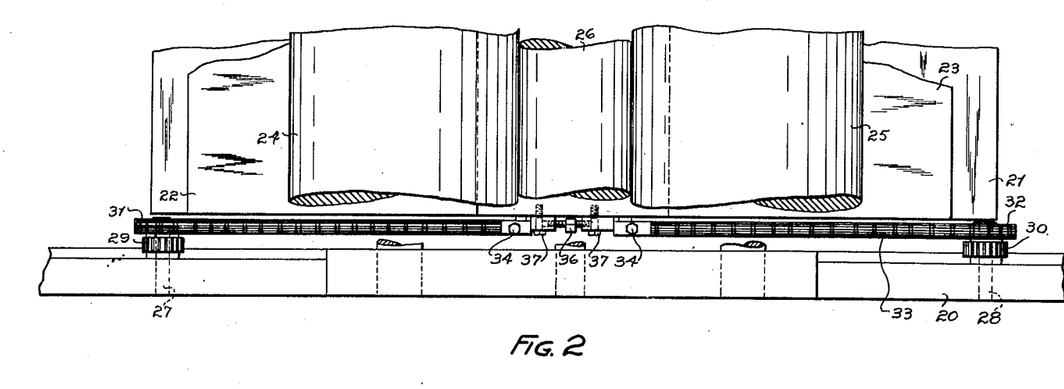
Fig. 2 is a fragmental plan view of the same.

In the drawings the frame of a flat bed printing press for two color work is indicated at 20. The reciprocating bed is shown at 21, and upon it are mounted printing forms 22 and 23. The bed is reciprocated by any suitable means, not shown, so as to have a forward stroke and a backward stroke in each complete cycle. An impression cylinder 24 is mounted in the frame for cooperation with the form 22, and a second impression cylinder 25 is similarly mounted for cooperation with the form 23. A transfer cylinder 26 is interposed between the cylinders 24 and 25. The impression cylinders 24 and 25 are moved up and down out of and into printing position by any suitable means, not shown.

In one of the side members of the frame 20 at widely separated points, we mount stub shafts 27 and 28, which carry gears 29 and 30 and sprocket wheels 31 and 32. A chain 33 extends over these two sprocket wheels, and the upper run is secured to the bed 21 near the middle of the latter, so that the chain and the two sprockets partake of the reciprocating motion of the bed.

The ends of the chain are preferably secured by screws 34 to metal blocks 35 which are connected together by a turnbuckle 36, by means of which the chain may be put under proper tension. The blocks 35 are slotted as shown to accommodate two studs 37 which extend into the bed 21 and serve to secure the chain to the bed, as well as to permit of a small degree of adjustment.

We have illustrated in detail the inker mechanism for one color only, it being understood that a similar mechanism may be employed for the other color. The gear 29 meshes with a ring gear 38 of considerable size which revolves upon a bearing block 39, see particularly Figs. 12 and 13. The ring gear 38 is engaged on the forward side by a circular flange 40 on block 39. On the opposite or rear side we provide two plates 41 and 42 which are screwed or otherwise removably secured to the block 39, and project radially outward beyond the inner surface of the ring 38, thereby retaining it in place.

Figure 5:
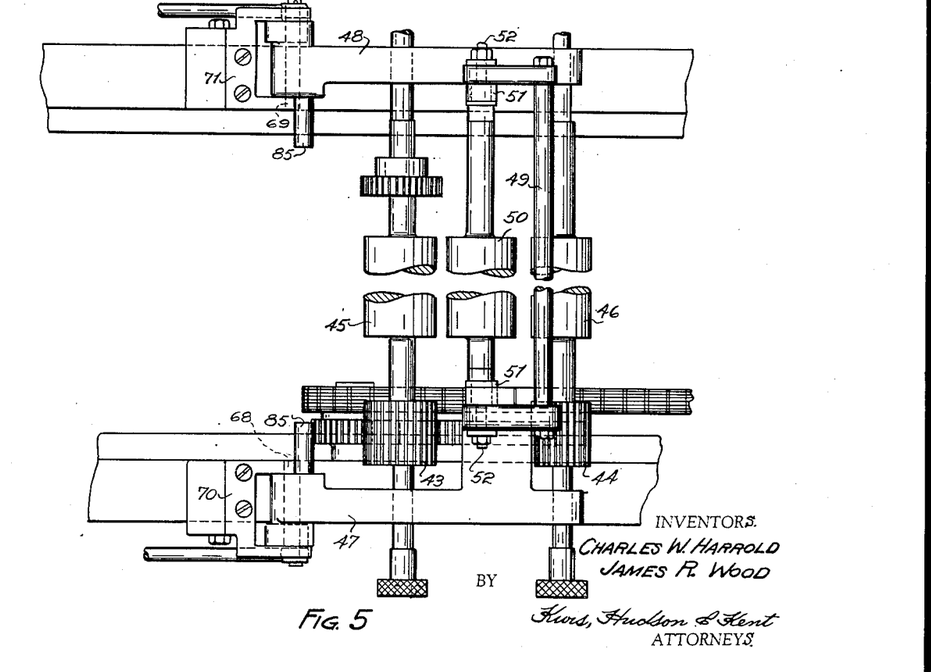
Fig. 5 is a plan view of the cage and rollers which cooperate with the form rollers of the inker mechanism.

The ring gear 38 meshes with two gears 43 and 44 keyed to the shafts of a pair of rollers 45 and 46. These rollers are mounted in bearings in a cage which comprises side elements 47 and 48 joined by a tie rod 49. The cage also carries an intermediate roller 50 which is journaled in bearings 51 that are adjustably clamped by studs 52 to extended portions of the cage.

The cage rollers 45, 46 and 50 are each adapted to engage adjacent rollers of a series of four composition form rollers 53, 54, 55 and 56 that are mounted in the frame to have adjustment both vertically and horizontally. The details of the adjusting means for these rollers form no part of the present invention. However they will be briefly described, it being noted that the adjusting means shown in Fig. 3 in connection with rollers 55 and 56 may be duplicated for rollers 53 and 54, and that a similar means is shown fragmentally in Fig. 11 applied to roller 54.

Figure 3:
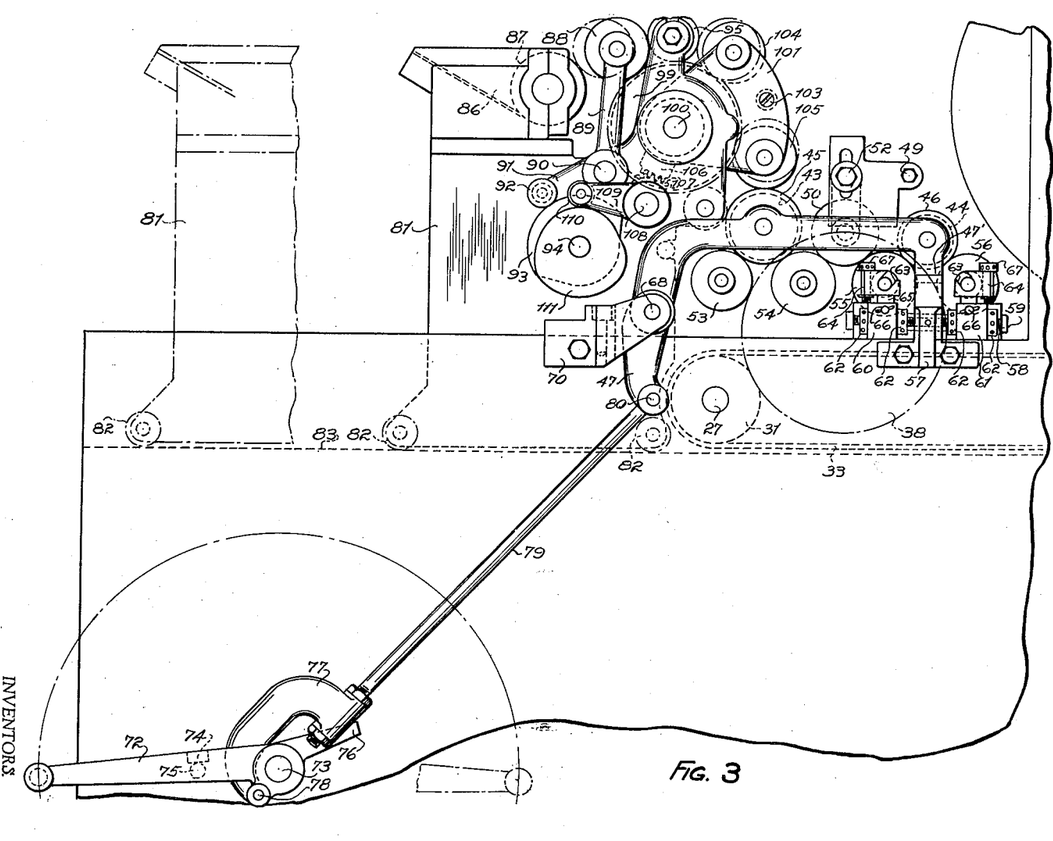
Fig. 3 is an elevational side view on a larger scale, showing the inker mechanism for one color in operative position.

Brackets 57 are bolted to the frame members at either side of the press. In each of these brackets there are pinned a horizontal threaded rod 58 and a horizontal smooth rod or shaft 59. Blocks 60 and 61 are horizontally slidable upon the frame, being guided by the smooth rod 59. Each block may be moved horizontally by means of capstan nuts 62 which are threaded on the rod 58. The trunnions or shafts for the form rollers rest in open sockets 63 formed in bearing blocks 64. These blocks have posts 65 extending downwardly into holes in the blocks 60 or 61, as the case may be, and these posts may be secured against movement by means of thumb screws 66. When the thumb screws are loosened the socket blocks 64 may be raised or lowered by means of capstan screws 67, the lower ends of which are threaded in blocks 60 and 61. By the means just described fine adjustment of the form rollers horizontally and vertically may be obtained.

The cage elements 47 and 48 carrying the rollers 45, 46 and 50 are mounted upon pivots 68 and 69 carried by brackets 70 and 71, respectively. The cage may be swung from the operative position illustrated in Fig. 3 to the inoperative position illustrated in Fig. 4, thereby exposing all of the form rollers 53, 54, 55 and 56, so that the latter may be readily and quickly lifted out of their bearing sockets if desired.

Figure 4:
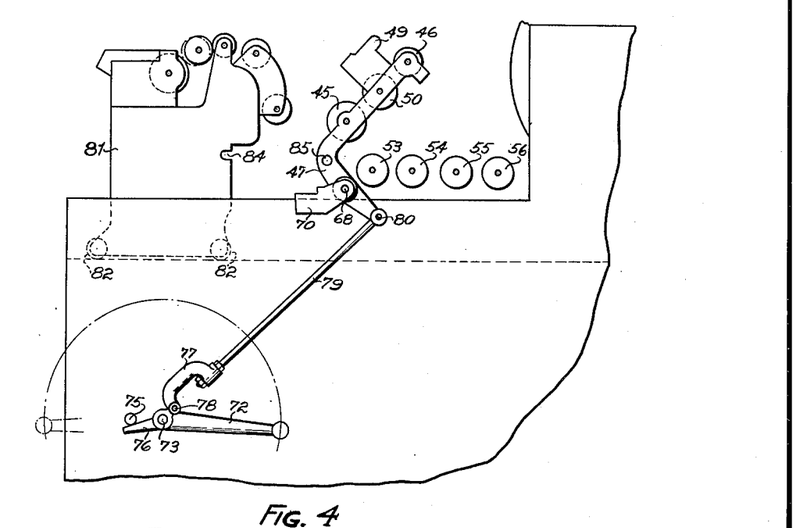
Fig. 4 is a small scale diagrammatic side view of the same, with the inker mechanism in inoperative position.

The swinging of the cage is preferably accomplished by a lever and link illustrated in Figs. 3 and 4. The lever shown at 72 is mounted on a shaft 73 carried by the frame side members. It has a projecting ear 74 adapted to engage a stop pin 75 also mounted in the frame. Beyond the shaft 73 there is an extension 76 of the handle, which is adapted to engage the stop pin 75 when the cage is in the inoperative position. The link comprises a yoke 77 pivotally connected at 78 with the lever 72 and adapted to clear the pivot 73 when the link is down, as shown in Fig. 3. The link also includes a rod 79 adjustably attached to yoke 77 and pivotally connected at 80 with a depending portion of the cage element 47.

When the parts are in the full line position of Fig. 3, the pivots 78, 73 and 80 are substantially in line, and hence any tendency for the cage rollers 45, 50 and 46 to move upwardly away from operative relation with the form rollers, is resisted. On the other hand, when the operator has swung the hand lever 72 over to the full line position of Fig. 4, where the extension 76 on the lever engages the stop 75, the pivots 73, 78 and 80 are again brought into substantial alignment, thereby resisting any tendency for the cage rollers to swing down from their inoperative position. On the free ends of cage elements 47 and 48 there are depending projections 47' which are adapted to engage the upper ends of brackets 57 when the cage and cage rollers are in operative position. The three cage rollers 45, 50 and 46 are metal rollers. 45 and 46 are positively driven by the ring gear 38, as previously explained, while roller 50 is rotated by reason of its frictional contact with form rollers 54 and 55.

81 is a carriage mounted upon four wheels 82, which run on tracks or ledges 83 in the machine frame. This carriage may be moved to the retracted position indicated in full lines in Fig. 4 and in dot and dash lines in Fig. 3. When the carriage is in its forward or operative position, notches 84 in its side members embrace stop pins 85 extending inwardly from the cage members 47 and 48. Suitable means, not shown, may be provided for releasably holding the carriage in operative position. In this carriage we mount all of the inker rolls except those heretofore described.

An ink fountain 86 of more or less conventional form is mounted at the top of the carriage, and a fountain roll 87 is associated therewith. 88 is a ductor roller mounted in the upper ends of two vibrating arms 89, which are keyed to a shaft 90 having bearing in the sides of the carriage. On the forward end of shaft 90 there is a crank 91 with a follower 92 which runs upon a cam 93 that is fixed to gear 130 rotating on stud 94. This latter gear rotates once for every complete cycle of the form, and causes the ductor roller 88 to move from the dotted line to the full line position of Fig. 3, occupying each of these positions for a portion of each cycle.

Figure 7:
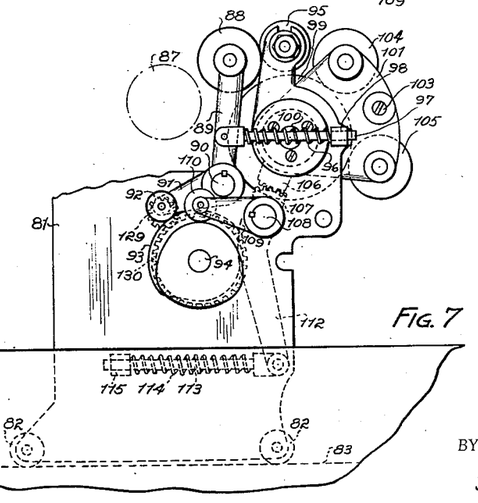
Fig. 7 is a side elevation of the same.

When the ductor roller 88 is in the full line position of Fig. 3, it contacts with a metal transfer roller 95, which is journaled in a pair of extensions on the carriage 81. The follower 92 is held against the cam 93 by a coil spring 96 surrounding a pin 97 pivoted to arm 89 and guided by a perforated ear 98 mounted on the carriage, see Fig. 7.

Figure 6:
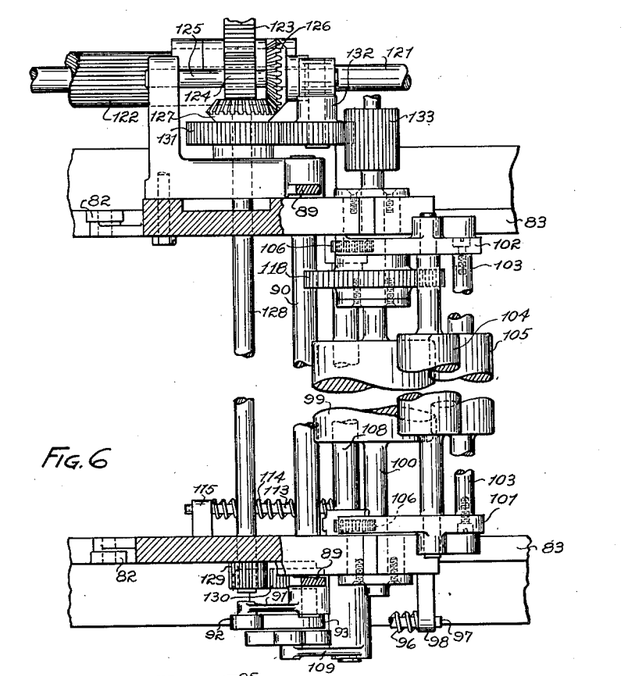
Fig. 6 is a plan view, partly in horizontal section, of the longitudinally movable carriage, together with the parts supported thereon.

Beneath the transfer roller 95, but spaced a short distance therefrom, there is a steel drum 99, which has a shaft 100 journaled in the sides of the carriage. Rotatably mounted on the shaft 100 but within the carriage side members, are a pair of sector shaped arms 101 and 102. These arms are connected by a tie rod 103. Between the arms 101 and 102 we mount two composition distributing rollers 104 and 105, each contacting with the surface of drum 99. Each arm is provided beneath the shaft 100 with a gear sector 106. These sectors mesh with sectors 107 mounted upon and keyed to a shaft 108. To the forward end of this shaft there is keyed a crank arm 109 carrying a follower 110 which runs upon a cam 111 secured to gear 130. A depending arm 112 keyed to shaft 108 has pivoted to its lower extremity a pin 113 surrounded by a coil spring 114 which abuts against a perforated ear 115 that acts as a guide for the pin.

The cam 111 during each rotation of gear 130 and hence during each cycle of bed movement, swings the arms 101 and 102 between the dotted and full line positions of Fig. 3. In the one position ink is taken from transfer roller 95 by distributing roller 104, and distributed over the surface of drum 99 and over the surface of distributing roller 105. In the other position ink on distributing roller 105 is spread over the surface of cage roller 45, and thence carried to the form rollers 53 and 54, form roller 54 also acting to carry the ink to cage roller 50, thence to form roller 55, and by way of cage roller 46 to form roller 56.

Figure 9:
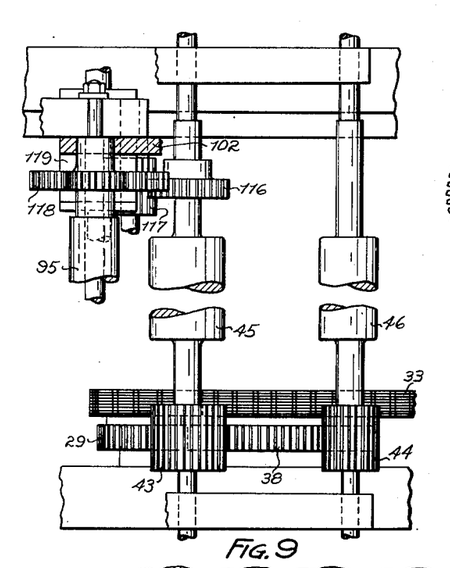
Fig. 9 is a fragmental plan view showing the driving means for the rollers which revolve in alternately opposite directions, timed with the reciprocations of the bed.
Figure 10:
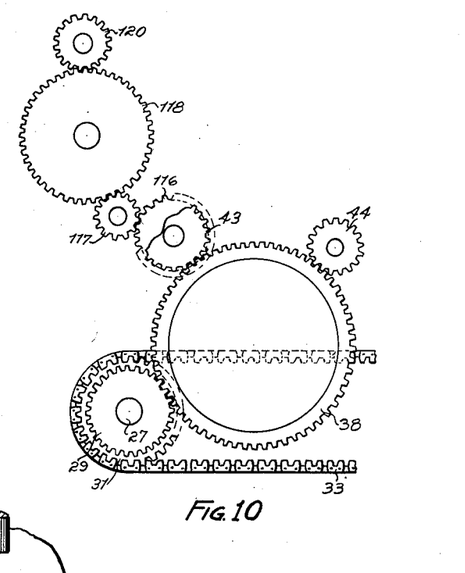
Fig. 10 is a diagrammatic elevational view of the same.

Transfer roller 95 is positively driven in alternately opposite directions by means associated with roller 45. Gear 38, which revolves in alternately opposite directions, as heretofore explained, rotates gear 43 which is fixed upon the shaft of roller 45. A gear 116, fixed on the shaft of roller 45 near the opposite side of the machine (see Figs. 9 and 10) meshes with a small idler 117, which in turn meshes with a gear 118 that is rotatably mounted upon a hub 119 attached to movable arm 102. Gear 118 is therefore an idler. It meshes with a gear 120 that is fixed upon the shaft of transfer roller 95. Roller 95 therefore partakes of an alternating motion timed with the reciprocations of the press bed.

Figure 8:
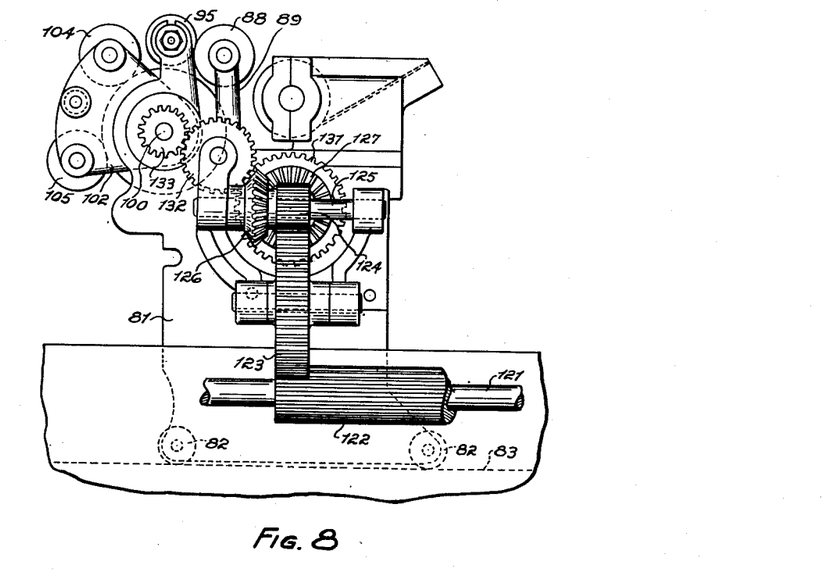
Fig. 8 is an elevational view of the opposite end of the carriage, showing the driving connections for the continuously rotating rollers.

The drum 99 and the distributing rollers 104 and 105 are continuously driven in the same direction. This drive comes through a shaft 121 mounted on the rear side of the machine and driven continuously by suitable means. Upon it is keyed a long gear 122 which meshes with a gear 123 that is rotatably mounted on the carriage 81. A small pinion 124 keyed to a short shaft 125, mounted in brackets on the carriage, meshes with the gear 123. The shaft 125 also carries a bevel gear 126 which meshes with a second bevel gear 127 that is fixed upon a shaft 128 that extends across the carriage transversely of the press. On the forward end of this shaft there is a pinion 129 which meshes with a gear 130 that idles on stud 94.

Near the rear end of the shaft 128 there is also keyed a gear 131 which meshes with an idler 132 that in turn meshes with a gear 133 which is keyed to the shaft 100, the latter being the shaft for drum 99. Rollers 104 and 105 are driven by friction from drum 99.

Whenever it is desired to clean or replace some or all of the rollers of the inker, the operator moves carriage 81 to the left from the full line position of Fig. 3 to the dotted line position of that figure, the drive for transfer roller 95 being thereby broken through the withdrawal of gear 117 from mesh with gear 116. The operator may then swing the handle 72 over to the full line position of Fig. 4, thereby moving the cage rollers 45, 50 and 46 up to the position illustrated in that figure. When this is done, the drive for the cage rollers 45 and 46 is broken through the withdrawal of gears 43 and 44 from meshing relation with ring gear 38. Any or all of the ink rollers may then be cleaned or removed.

Figure 11:
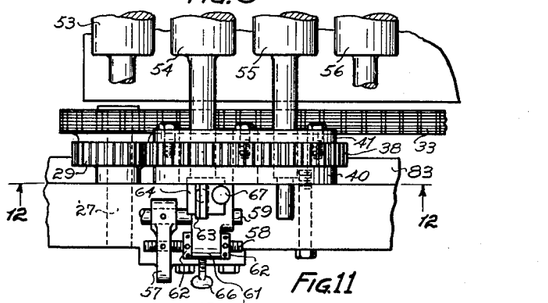
Fig. 11 is a diagrammatic plan view somewhat similar to Fig. 9, but showing the cage rollers removed and illustrating the means for adjustment of the form rollers, two of which are shown with their shafts or trunnions projecting through the driving mechanism.
Figure 12:
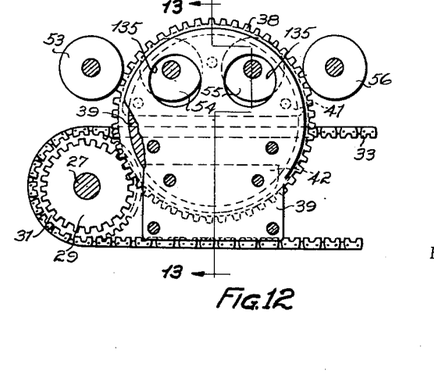
Fig. 12 is a vertical sectional view taken substantially on the line 12—12 of Fig. 11.
Figure 13:
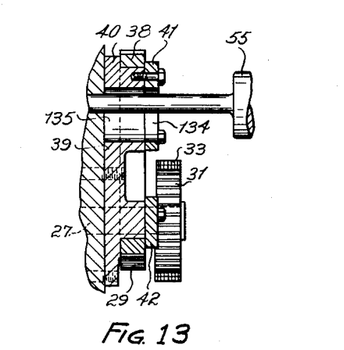
Fig. 13 is a fragmental sectional view taken substantially on the line 13—13 of Fig. 12.

It will be noted by reference particularly to Figs. 11, 12 and 13 that the shafts for the intermediate form rollers 54 and 55 extend through openings 134 in the retaining plate 41 and registering openings 135 in the bearing 39 for ring gear 38. This arrangement permits the use of a simple direct drive for the gears 43 and 44. It also permits adjustment of the form rollers 54 and 55, even while the press is in operation, without in any manner disturbing the driving connections.

Figure 14:
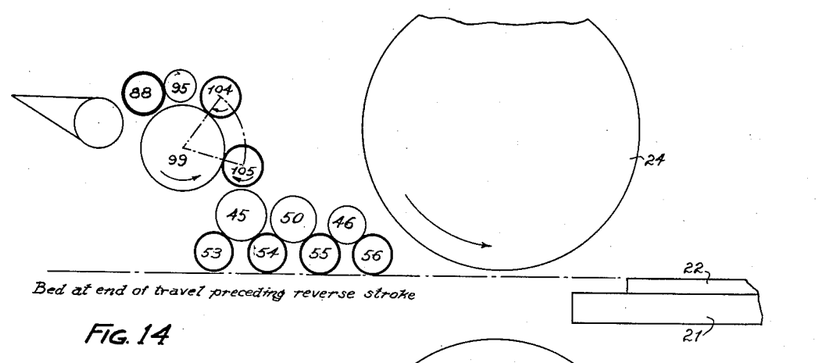
Figs. 14 to 19 inclusive are diagrammatic views illustrating the rollers of the inker mechanism at different points during a complete cycle of the press bed.
Figure 19:
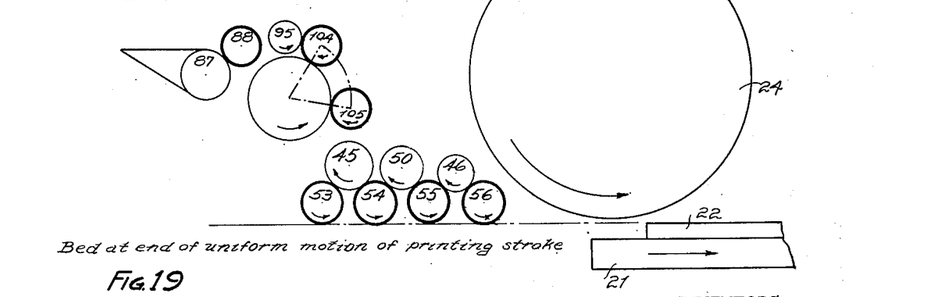

*Operation.* In following the action of the inker mechanism during normal operation of the press, reference should be had to the diagrammatic illustrations of Figs. 14 and 19 inclusive. In Fig. 14 the parts are shown in their position and condition at the beginning of the bed travel on the reverse or non-printing stroke. The bed motion on each stroke includes firstly an accelerating travel at the beginning of the stroke, starting from zero and increasing to maximum speed, secondly continuous travel at maximum speed through the major part of the stroke, and thirdly a motion of deceleration from maximum to zero at the end of the stroke. In Fig. 14 the bed 21 and the form 22 are stationary. At this time all of the reversing rollers 53, 54, 55, 56, 45, 50, 46 and 95 are stationary. Drum 99 and rollers 104 and 105, which are continuously driven, are rotated in the directions indicated by arrows. The rollers 104 and 105 are out of engagement with the transfer roller 95 and the cage roller 45, being in process of moving away from roller 95 toward roller 45. Transfer roller 95, which is stationary, is in engagement with ductor roller 88.

Figure 15:
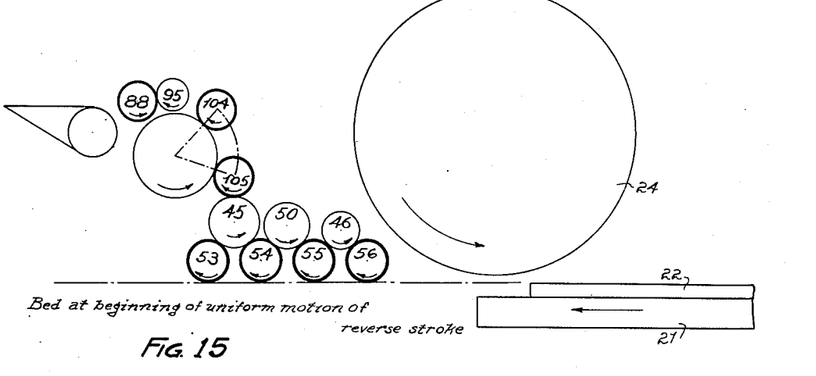

Now, as the bed 21 begins to accelerate, the form rollers and the cage rollers begin to move in the directions indicated by arrows in Fig. 15, and the roller 95 begins to move likewise in the direction of the arrow in the latter figure, friction also rotating roller 88 as indicated. As soon as maximum bed speed is reached, roller 105 goes into engagement with roller 45, the surface speeds of these two rollers being then substantially the same. This is the condition illustrated in Fig. 15, that is at the beginning of the uniform speed movement of the stroke. At this time the rollers 95 and 88 are also revolving at maximum speed.

Figure 16:
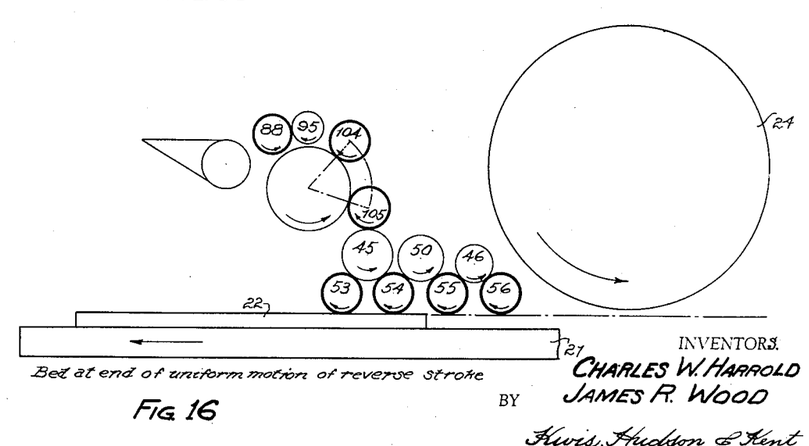
Figure 17:
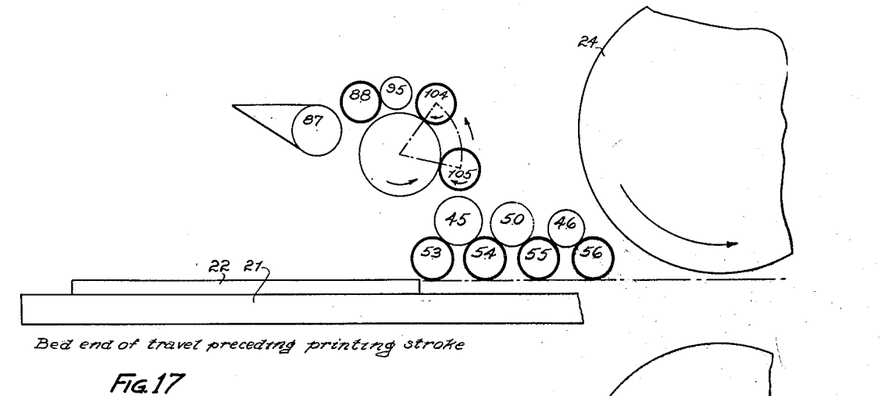

The condition last described continues until the end of the uniform motion on this stroke is reached, which condition is illustrated in Fig. 16. At this point the bed motion begins to decelerate and the two distributing rollers 105 and 104 begin their upward bodily movement. Rollers 95 and 88 remain in engagement during deceleration however in order that the rotation of roller 88 may be gradually brought to a stop. When the bed reaches the end of this stroke the rollers occupy the positions indicated in Fig. 17. All of the reversing rollers, including the form rollers, the cage rollers and the roller 95 are stationary. Ductor roller 88 is likewise stationary.

Figure 18:
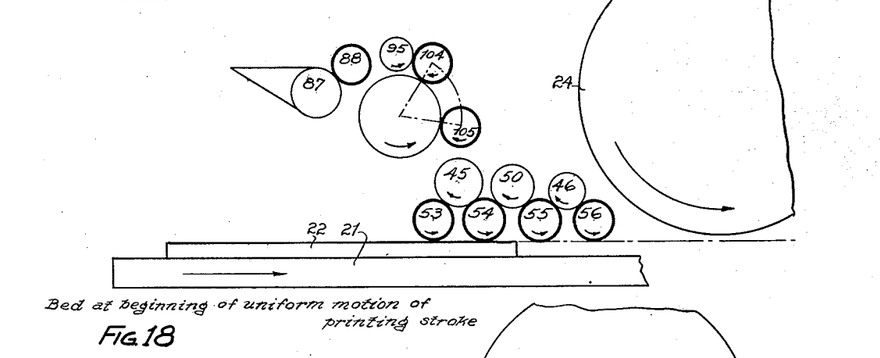

The bed now begins its travel on the next half cycle, which is the printing stroke. During acceleration of the bed on this stroke the reversing rollers come up to speed. The upward swing of the rollers 105 and 104 proceeds and is completed just as the roller 95 reaches maximum speed, at which time the surface speeds of the rollers 104 and 95 are approximately equal. At the beginning of acceleration, while roller 95 is still stationary, the ductor roller 88 starts away from roller 95 and moves toward fountain roller 87, which it is caused to engage as promptly as smooth operation will permit. Roller 88 is therefore stationary when it engages fountain roller 87, which is the desired condition. The rollers at the beginning of the uniform motion on the printing stroke are therefore in the positions and in the conditions illustrated in Fig. 18. The form 22 is being inked by the form rollers, the distributing rollers are receiving ink from transfer roller 95, and the ductor roller is getting its charge of ink from the fountain roller 87. At the end of the uniform motion on the printing stroke the rollers are in the same condition and position as indicated in Fig. 19. Deceleration then begins, the rollers 104 and 105 immediately begin to move downwardly, and the ductor roller 88 begins to travel toward the transfer roller 95, which it reaches just at the end of the stroke, when the roller 95 is stationary. The parts at this time are then in the position and condition of Fig. 14, and the cycle is ready to be repeated.

It will be obvious therefore that the ductor roller 88 never makes or leaves contact with the roller 95 when that roller is rotating rapidly, and hence the rotation of roller 88 is always under control. Furthermore the strip of ink received by roller 88 from the fountain roller is evenly distributed over the surface of roller 95, since the rollers 88 and 95 revolve in engagement with each other through substantially all of the travel of the bed in one direction. It will also be obvious that rollers 104 and 95 on the one hand and the rollers 105 and 45 on the other hand engage only when the reversing rollers 95 and 45 respectively are rotating at maximum speed, which is the same surface speed as the continuously rotating rollers 104 and 105.

In the foregoing description we have necessarily gone somewhat into detail in order to explain fully the particular embodiments of the invention herein illustrated, but we desire it to be understood that such detailed disclosures are not to be construed as a mounting to limitations, except as they may be included in the appended claims.

Having thus described our invention, we claim:

1. In a printing press, an inker mechanism therefor comprising a ductor roller, a transfer roller, a series of distributing rollers and a form roller group, means for causing the ductor roller and transfer roller to come into contact while the transfer roller is not revolving, means for causing the ductor roller and the transfer roller to revolve in contact with each other throughout substantially one stroke of the form, the said rollers being otherwise free at the time, and means for thereafter causing the transfer roller to ink the distributing rollers and the distributing rollers to ink the form rollers.

2. In a printing press, a reciprocating form, an inker mechanism therefor comprising a transfer roller, means for applying ink to and spreading it over the surface of said transfer roller, a series of distributing rollers and a form roller group, means for causing the transfer roller and one of the rollers of said distributing series to come together after the ink has been spread upon the surface of the transfer roller, means for causing the revolution of said two last named rollers in contact with each other throughout the major portion of a stroke of the form while all the rollers of the distributing series are free from engagement with the rollers of the form group, and means for thereafter causing the distributing series to ink the rollers of the form group.

3. In a printing press, a reciprocating form, a transfer roller, means for driving said roller in timed relation with the reciprocations of the form to start rotation as the form starts upon its movement in one direction and to stop rotation as the form stops movement in that direction, and a ductor roller moving into operative relation with said transfer roller during the time occupied by the stopping of rotation of that roller in one direction and the starting of its rotation in the opposite direction.

4. In a printing press, a reciprocating form, a transfer roller rotating in alternately opposite directions in timed relation to the reciprocations of the form, and a ductor roller moving into operative relation with said transfer roller at substantially the point of transition of rotation of that roller from one direction to the other, said rollers remaining in contact during approximately the entire movement of the form in one direction.

5. In a printing press, a reciprocating form, a distributing roller, a ductor roller, and a transfer roller interposed between said ductor roller and distributing roller, means for driving said distributing roller continuously in the same direction, means for driving said transfer roller in timed relation with the reciprocations of the form to start rotation of the transfer roller as the form starts upon a stroke of its movement and to stop rotation of the transfer roller as the form stops movement upon that stroke, means for causing said ductor roller and transfer roller to engage each other approximately at the time the transfer roller begins its rotation corresponding with a given stroke of the form, and means for causing said transfer roller and ductor roller to disengage substantially at the time the transfer roller stops rotation at the end of the same stroke.

6. In a printing press, a reciprocating form, a distributing roller, a ductor roller, and a transfer roller interposed between said ductor roller and distributing roller, means for driving said distributing roller continuously in the same direction, means for driving said transfer roller in timed relation with the reciprocations of the form to start rotation of the transfer roller as the form starts upon a stroke of its movement and to stop rotation of the transfer roller as the form stops movement upon that stroke, means for causing said ductor roller and transfer roller to engage each other approximately at the time the transfer roller begins its rotation corresponding with a given stroke of the form, means for causing said transfer roller and ductor roller to disengage substantially at the time the transfer roller stops rotation at the end of the same stroke, and means for causing said transfer roller and distributing roller to engage after the transfer roller has come up to speed during the next stroke of the form.

7. In a printing press, a reciprocating form, inking mechanism therefor comprising a transfer roller rotating in opposite directions alternately, a form roller group rotating in opposite directions alternately, a distributing drum rotatable continuously in one direction, a holder oscillatable about the axis of said distributing drum, a pair of distributing rollers mounted in said holder contacting with said distributing drum, and means for oscillating said holder to cause one roller of said pair to engage said transfer roller a part of the time and to cause the other of said pair during another interval to engage one of the rollers of said form roller group, the oscillations of said holder being timed to cause engagement only when the contacting roller surfaces are moving in the same direction.

8. In a printing press, a reciprocating form, a series of form rollers adapted to contact with said form, frame members in which said form rollers are adjustably mounted, means for driving said form rollers comprising a ring gear, and a bearing within the frame upon which said ring gear revolves, said bearing having therein an opening through which one of said form rollers extends loosely.

9. In a printing press, a reciprocating form, a series of form rollers adapted to contact with said form, frame members in which said form rollers are adjustably mounted, means for driving said form rollers comprising a ring gear, a bearing within the frame upon which said ring gear revolves, said bearing having openings therethrough providing clearance for two adjacent form rollers, whereby said rollers may be adjusted without interfering with the said driving means.

10. In a printing press, a reciprocating form, a form roller group comprising a series of form rollers contacting with the form and other ink rollers contacting with said form rollers, means for driving two of said ink rollers in alternately opposite directions comprising gears on said two ink rollers and a ring gear meshing with said first named gears, a bearing for said ring gear, said bearing having an opening therein through which the shaft of one of said form rollers loosely extends, and an adjustable mounting for the end of said shaft.

11. In a flat bed printing press, a reciprocating bed, a form mounted thereon, a form roller group comprising a series of form rollers contacting with said form, said group also comprising ink rollers each contacting with adjacent form rollers, an endless chain, a connection between said chain and said reciprocating bed, two of said ink rollers having gears thereon, a ring gear meshing with said first named gears, means associated with said chain for rotating said ring gear in alternately opposite directions, a bearing for said ring gear, said bearing having an opening therein through which the shaft of one of said form rollers loosely extends, and an adjustable mounting for the end of said shaft.

12. In a printing press, a reciprocating form, inking mechanism comprising form rollers rotating in alternately opposite directions in contact with said form, continuously rotating distributing rollers, a carriage supporting the distributing rollers, means for guiding said carriage away from said form rollers into a position where the distributing rollers will not interfere with removal of the form rollers, and driving connections for said continuously rotating distributing rollers operative in all positions of said carriage.

13. In a printing press, a reciprocating form, inking mechanism comprising form rollers rotating in alternately opposite directions in contact with said form, continuously rotating distributing rollers, a carriage supporting the distributing rollers, a transfer roller also mounted in said carriage, means for guiding said carriage away from said form rollers into a position where the distributing rollers will not interfere with removal of the form rollers, driving connections for said continuously rotating distributing rollers operative in all positions of said carriage, and means for driving said transfer roller operative only when said carriage is in operative position.

14. In a flat bed printing press, a frame, two form rollers mounted therein, a cage pivotally mounted on the frame, a roller mounted in said cage adapted to operatively engage both of said form rollers simultaneously, a lever and link means for swinging said cage about its pivot to operative position or to inoperative position, the said cage roller in the latter position of the cage being withdrawn sufficiently to permit the two form rollers to be removed, a carriage longitudinally movable on said frame, a distributing roller in said carriage adapted to contact with said cage roller when the mechanism is in operative position and to clear said cage roller when the carriage and the cage are moved to inoperative position.

15. In a printing press inking mechanism, an ink supply, a plurality of positively driven reversing rollers, a continuously rotating roller, means for transferring ink from said supply to one of said reversing rollers and thence to said continuously rotating roller and thence to another of said reversing rollers, and means comprising said last named roller acting to convey ink from said continuously rotating roller to the form of the press.

16. In a printing press inking mechanism, an ink supply, a plurality of positively driven reversing rollers, a continuously rotating roller, means for transferring ink from said supply to one of said reversing rollers, means acting at different times to transfer ink from said last mentioned reversing roller to said continuously rotating roller and from the latter to another of said reversing rollers, and means comprising said last named roller acting to convey ink from said continuously rotating roller to the form of the press.

17. In a printing press inking mechanism, an ink supply, a first positively driven reversing roller, a continuously rotating roller, means comprising a second positively driven reversing roller arranged to deliver ink from said continuously rotating roller to the form of the press, means for transferring ink from said ink supply to said first reversing roller, and roller means for transferring ink from said first reversing roller to said continuously rotating roller and thence to said second reversing roller.

18. In a printing press inking mechanism, an ink supply, two reversing rollers so driven as to rotate at a substantially uniform rate during a portion of their rotation, roller means continuously rotating at a rate substantially the same as the uniform rate of rotation of said reversing rollers, means for transferring ink from said supply to the first of said reversing rollers, means comprising said second reversing roller arranged to deliver ink received from said continuously rotating roller means, said continuously rotating roller means being adapted to coact with each of said reversing rollers during a time when the corresponding roller is rotating at constant speed to receive ink from the first of said reversing rollers and to transmit ink to the second of said reversing rollers.

19. In a printing press inking mechanism, an ink supply, and means for distributing and transmitting ink to the printing press form, comprising a reversing roller, a ductor roller between said ink supply and said reversing roller for transferring ink to the latter, said ductor roller being actuated to make and break contact with said reversing roller when the latter is substantially at the point of transition of rotation from one direction to the other, a continuously rotating roller contacting with said reversing roller when the latter is up to speed, and means for transferring ink from the continuously rotating roller to the printing press form.

20. In a printing press, the combination with a reciprocating bed carrying a form, of a form inking mechanism comprising an ink supply, a plurality of inking rollers, means for driving an inking roller continuously in one direction, means for driving other of said rollers with reverse rotary movements in unison with the movements of the bed, and means for transferring ink from said ink supply to one of said reversing rollers, means for transferring ink from the last named reversing roller to said continuously driven roller during the travel of the bed in one direction and for transferring ink from said continuously driven roller to another of said reversing rollers during the next subsequent travel of the bed in the opposite direction.

21. In a printing press, the combination with a form carrying bed having intermediate constant speed travel in opposite directions and reversing movements at the ends of its strokes, of a form inking mechanism comprising an ink supply, ink rollers including a plurality of form rollers and a plurality of distributing rollers, means for driving at least one of said distributing rollers at constant speed in one direction, means for driving other of said rollers with reverse rotary movements in unison with the movements of the bed, roller means for transferring ink from said supply to one of said reversing rollers, said roller means being adapted to engage said last mentioned roller during the stroke of the bed defined by the movement of the latter in one direction, and means operative to alter the position of certain of said distributing rollers for transferring ink from said one of said reversing rollers to said constant speed roller during the constant speed portion of the first subsequent stroke of the bed, and from said constant speed roller to said form rollers during the constant speed portion of the second subsequent stroke of the bed.

22. In a printing press, the combination with a reciprocating bed carrying a form, of form inking mechanism comprising an ink supply, ink rollers including a plurality of distributing rollers and a plurality of form rollers, the latter being adapted to engage the form during its movements in both directions, means for driving at least one of said distributing rollers at constant speed in one direction, means for driving other of said distributing rollers with reverse rotary movements in unison with the movements of the bed, roller means for transferring ink from said supply to one of said reversing rollers, and means operative to alter the position of certain of said distributing rollers for transferring ink from said one of said reversing rollers to said constant speed roller and subsequently from said constant speed roller to said form rollers, said last named means being so timed relative to the movements of the bed that the transfer of ink to said form rollers occurs during the passage of the form under the form rollers immediately following the taking of an impression from the form.

23. In a printing machine, the combination with a form carrying bed having an intermediate constant speed travel in opposite directions and reversing movements at the ends of its strokes, of a transfer roller, means for driving said roller in timed relation with the reciprocations of the form to start rotation with a gradually accelerating motion as the form starts upon a stroke of its movements and to stop rotation with a gradually decelerating motion as the form stops movement upon that stroke, and a ductor roller moving into operative relation with said transfer roller during the time occupied by the stopping of the rotation of that roller for one stroke and the starting of its rotation for the next stroke.

24. In a printing press, a reciprocating form, an inker mechanism therefor comprising a ductor roller, a transfer roller, a series of distributing rollers and a form roller group, means for causing the ductor roller and transfer roller to revolve in contact during one stroke only of the form, means for causing the transfer roller to revolve in contact with one of the rollers of the distributing series during the next subsequent stroke of the form only, and means for causing one of the rollers of the distributing series to revolve in contact with one of the rollers of the form roller group during the next succeeding stroke of the form.

25. In a printing press, a reciprocating form, inker mechanism therefor comprising a transfer roller, a form roller group and a series of distributing rollers, means associated with the reciprocating form for imparting rotation in alternately opposite directions to the rollers of said form roller group and to said transfer roller in successive strokes of the form, means for driving the distributing rollers continuously in the same direction, means for inking the transfer roller while the latter is revolving in one direction, and means for causing said series of distributing rollers to take ink from the transfer roller when the latter is revolving in the opposite direction, said series of distributing rollers moving alternately during successive strokes of the form into operative relation with the transfer roller and with a roller of the form roller group.

26. In a printing press inking mechanism, an ink supply, an ink roller continuously rotating in one direction with a given surface velocity, an ink transfer roller located between the ink supply and the continuously rotating roller for receiving ink from the former and delivering it to the latter, means for imparting to said transfer roller periodic non-uniform rotation including a period of gradual acceleration substantially from zero velocity to the velocity of said continuously rotating roller and a period of gradual deceleration from the velocity of the continuously rotating roller to zero velocity, and means effective during normal operation of the mechanism to cause transfer of ink from said transfer roller to said continuously rotating roller during an interval between successive periods of acceleration and deceleration of the transfer roller and to prevent such transfer of ink during periods of acceleration and deceleration.

27. In a printing press inking mechanism, an ink supply, an ink roller continuously rotating in one direction with a given surface velocity, an ink transfer roller located between the ink supply and the continuously rotating roller for receiving ink from the former and delivering it to the latter, means for imparting to said transfer roller periodic non-uniform rotation including a period of gradual acceleration substantially from zero velocity to the velocity of said continuously rotating roller and a period of gradual deceleration from the velocity of the continuously rotating roller to zero velocity, means effective to cause transfer of ink from said transfer roller to said continuously rotating roller while both of said rollers are rotating with substantially the same speed, and a ductor roller between said supply and said transfer roller for taking ink from the former and transmitting it to the latter, said ductor roller being arranged to make and break contact with said transfer roller when the latter is substantially stationary.

28. In a printing press inking mechanism, an ink supply, an ink roller continuously rotating in one direction with a given surface velocity, an ink transfer roller located between the ink supply and the continuously rotating roller for receiving ink from the former and delivering it to the latter, means for positively driving the transfer roller with periodic non-uniform rotation increasing from zero velocity to the velocity of said continuously rotating roller, remaining at the latter velocity for a time and decreasing to zero, and means effective during normal operation of the mechanism to cause the transfer of ink from said transfer roller to said continuously rotating roller during the time said two rollers are rotating at the same velocity and to prevent the transfer of ink from said transfer roller to said continuously rotating roller at other times.

29. In a printing press inking mechanism, an ink supply, an ink roller continuously rotating in one direction with a given surface velocity, an ink transfer roller located between the ink supply and the continuously rotating roller, means for positively driving the transfer roller with periodic non-uniform rotation, increasing from zero velocity to the velocity of said continuously rotating roller, remaining at the latter velocity for a time and decreasing to zero, means effective during normal operation of the mechanism to cause the transfer of ink from said transfer roller to said continuously rotating roller during times when said rollers are rotating at the same velocity and to prevent transfer of ink from said transfer roller to said continuously rotating roller at other times, and a ductor roller between said supply and said transfer roller arranged to convey ink from the former to the latter, said ductor roller being arranged to make and break contact with said transfer roller at times when the velocity of the latter is substantially zero.

30. In a printing press inking mechanism, an ink supply, an ink roller continuously rotating in one direction with a given surface velocity, an ink transfer roller located between the ink supply and the continuously rotating roller, means for positively driving the transfer roller with periodic non-uniform rotation, the rotation in each period increasing from zero velocity to the velocity of said continuously rotating roller, remaining at the latter velocity for a time and decreasing to zero, means effective during normal operation of the mechanism to cause the transfer of ink from said transfer roller to said continuously rotating roller during times when said two rollers are rotating at the same velocity and to prevent transfer of ink from said transfer roller to said continuously rotating roller at other times, and a ductor roller between said supply and said transfer roller arranged to convey ink from the former to the latter, said ductor roller being arranged to make and break contact with said transfer roller at times when the velocity of the latter is substantially zero, said last mentioned means and said ductor roller being so timed that transfer of ink from said ductor roller to said transfer roller and transfer of ink from said transfer roller to said continuously rotating roller occur during alternate periods of rotation of said transfer roller.

CHARLES W. HARROLD.
JAMES R. WOOD.